US012554826B2

(12) United States Patent
Sakai et al.

(10) Patent No.: US 12,554,826 B2
(45) Date of Patent: Feb. 17, 2026

(54) SYSTEM, VEHICLE, AND METHOD (71) Applicant: HONDA MOTOR CO., LTD., Tokyo (JP)

(72) Inventors: Yuki Sakai, Tokyo (JP); Yu Yoshii, Tokyo (JP); Shoichi Ito, Tokyo (JP); Ryosuke Horie, Tokyo (JP); Takato Fukuno, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 494 days.

(21) Appl. No.: 18/167,070

(22) Filed: Feb. 10, 2023

(65) Prior Publication Data

US 2023/0306101 A1 Sep. 28, 2023

(30) Foreign Application Priority Data

Mar. 28, 2022 (JP) ................................. 2022-051493

(51) Int. Cl.
*G06F 21/00* (2013.01)
*B60R 16/023* (2006.01)
(Continued)

(52) U.S. Cl.
CPC .......... *G06F 21/44* (2013.01); *B60R 16/0231* (2013.01); *H04L 7/0016* (2013.01); *H04L 9/32* (2013.01); *H04L 67/12* (2013.01)

(58) Field of Classification Search
CPC ... B60R 16/0231; G06F 21/44; H04L 7/0016; H04L 9/32
See application file for complete search history.

(56) References Cited

U.S. PATENT DOCUMENTS

2018/0219872 A1 8/2018 Sugashima
2018/0314857 A1 11/2018 Morita
(Continued)

FOREIGN PATENT DOCUMENTS

JP 2012034006 A 2/2012
JP 2017038365 A 2/2017
(Continued)

OTHER PUBLICATIONS

Office Action issued for counterpart Japanese Application No. 2022-051493, transmitted from the Japanese Patent Office on Sep. 16, 2025 (drafted on Sep. 8, 2025).

*Primary Examiner* — Rodman Alexander Mahmoudi (57) ABSTRACT

A system includes a plurality of in-vehicle devices and having a function of determining abnormality of communication in the devices by authenticating a message including data, a first counter counted each time a power source is turned on, and a second counter incremented over time. The system includes an authentication unit for performing, when a message including control data to be exchanged between the devices is authenticated, authentication on a message sent and received between the devices and including at least the control data and the first counter by using at least the control data and the first counter, in which when it is confirmed whether synchronization is achieved between the devices, the authentication unit is for performing authentication on a message sent and received between the devices and not including the first counter but including the second counter by using the second counter without using the first counter.

20 Claims, 7 Drawing Sheets (51) Int. Cl.
*G06F 21/44* (2013.01)
*H04L 7/00* (2006.01)
*H04L 9/32* (2006.01)
*H04L 67/12* (2022.01)

(56) References Cited

U.S. PATENT DOCUMENTS

| | | | |
|---|---|---|---|
| 2020/0369242 A1 | 11/2020 | Komedani | |
| 2021/0026347 A1* | 1/2021 | Nakashima | B60K 35/10 |
| 2021/0176071 A1* | 6/2021 | Maass | H04L 67/10 |
| 2022/0094684 A1 | 3/2022 | Komedani | |
| 2024/0187277 A1* | 6/2024 | Kitagawa | H04L 7/00 |

FOREIGN PATENT DOCUMENTS

| | | | |
|---|---|---|---|
| JP | 2017092634 A | 5/2017 |
| JP | 2018078473 A | 5/2018 |
| WO | 2019159593 A1 | 8/2019 |
| WO | 2020246145 A1 | 12/2020 |

* cited by examiner

SYSTEM, VEHICLE, AND METHOD

The contents of the following Japanese patent application(s) are incorporated herein by reference:
NO. 2022-051493 filed on Mar. 28, 2022.

BACKGROUND

1. Technical Field

The present invention relates to a system, a vehicle, and a method.

2. Related Art

Patent document 1 discloses that in an electronic control apparatus included in an automobile, a key is switched every time the ignition ON is executed eight times.

LIST OF CITED REFERENCES

Patent Document 1: WO2019/159593

DESCRIPTION OF EXEMPLARY EMBODIMENTS

Hereinafter, the present invention will be described by way of embodiments of the invention. However, the following embodiments are not intended to limit the invention according to the claims. In addition, not all of the combinations of features described in the embodiments are essential to solving means of the invention.

Figure 1:
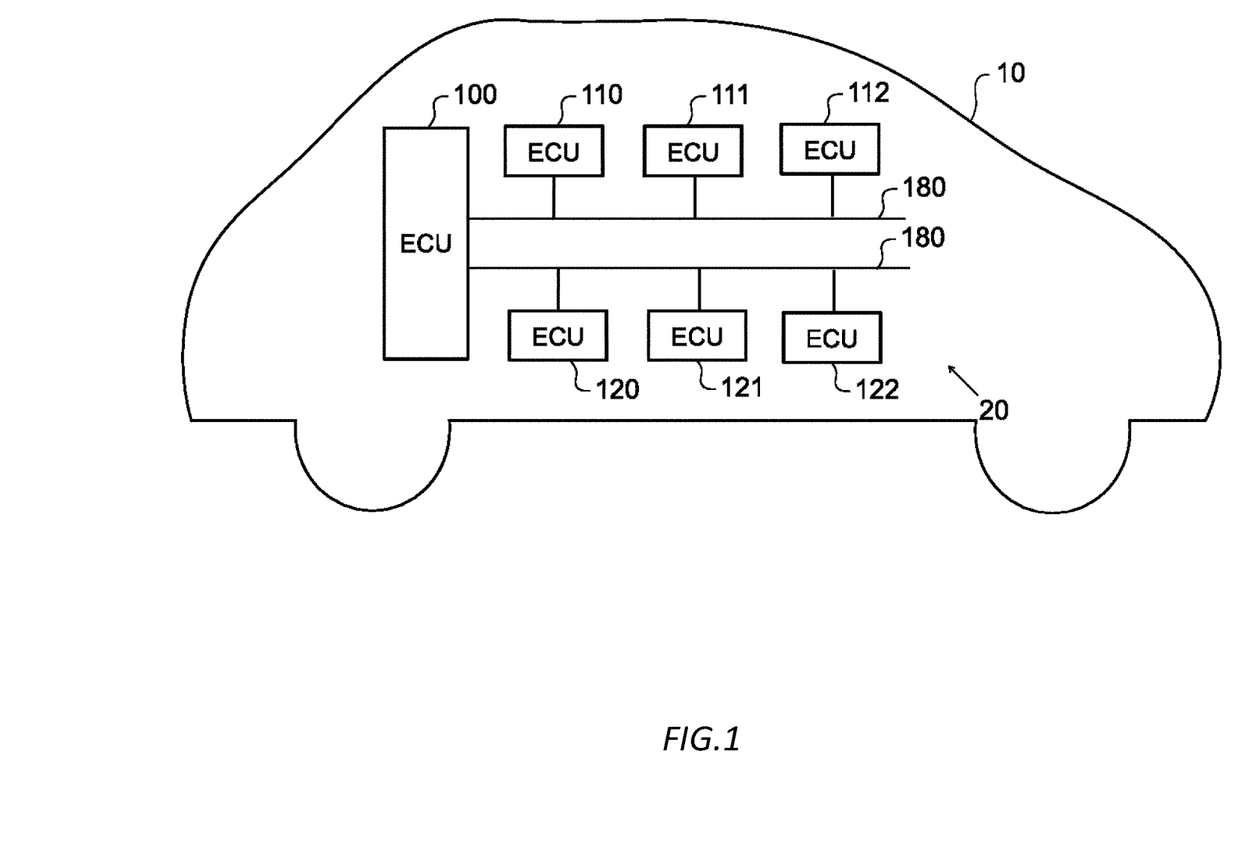
FIG. 1 conceptually illustrates a system configuration of a vehicle 10 in an embodiment.

FIG. 1 conceptually illustrates a system configuration of a vehicle 10 in an embodiment. The vehicle 10 includes a system 20. The system 20 includes a plurality of electronic control units (ECUs) including an ECU 100, an ECU 110, an ECU 111, an ECU 112, an ECU 120, an ECU 121, and an ECU 122. The ECUs included in the vehicle 10 include an ECU configured to control equipment which directly affects travelling of the vehicle 10, such as, for example, an engine, a gearbox, or a steering gear. The ECUs included in the vehicle 10 include an ECU configured to control equipment which does not directly affect travelling of the vehicle 10, such as, for example, an air conditioner or a navigation device.

The ECUs included in the vehicle 10 are configured to mutually perform communication by controller area network (CAN) communication. Each of the ECUs included in the vehicle 10 is connected so as to be mutually communicable by a plurality of CAN communication networks 180. The ECU 100 may function as a gateway configured to relay communication between the plurality of CAN communication networks 180.

Figure 2:
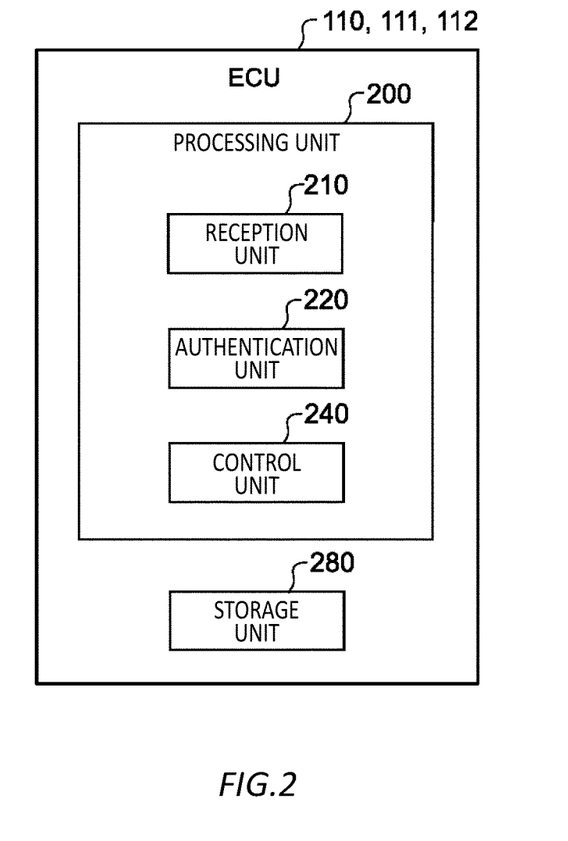
FIG. 2 is a block diagram schematically illustrating a functional configuration included in an ECU 110.

FIG. 2 is a block diagram schematically illustrating a functional configuration included in the ECU 110, the ECU 111, and the ECU 112. The ECU 110, the ECU 111, and the ECU 112 include a processing unit 200 and a storage unit 280.

The ECU 110, the ECU 111, and the ECU 112 are an example of an in-vehicle device. As an example, the ECU 110 may be an ECU for vehicle stability assist (VSA) (registered trademark) control. The ECU 111 and the ECU 112 may be an ECU for electric power steering (EPS) control, an ECU for supplemental restrain system (SRS) control, an ECU for electronic braking system (EBS) control, or the like.

The processing unit 200 may be implemented by a processor such as a central processing unit (CPU) configured to perform computation processing. The storage unit 280 may include a nonvolatile storage medium such as a flash memory or a volatile storage medium such as a random access memory. Each of the ECU 110, the ECU 111, and the ECU 112 may be configured to include a computer. The processing unit 200 operates according to a program stored in the nonvolatile storage medium, and the ECU 110, the ECU 111, and the ECU 112 thereby perform various types of controls.

The processing unit 200 includes a reception unit 210, an authentication unit 220, and a control unit 240. In the description related to FIG. 2, authentication units 220 included in the ECU 110, the ECU 111, and the ECU 112 may be collectively referred to as the authentication unit 220. The reception unit 210 is configured to receive data sent and received with another ECU.

The ECU 110, the ECU 111, and the ECU 112 have a function of determining abnormality of communication in the ECU 110, the ECU 111, and the ECU 112 by authenticating a message including data to be sent and received, a first counter configured to be counted each time a power source is turned on, and a second counter configured to be incremented over time. The authentication of the message is performed by using a message authentication code (MAC). As will be described below, the first counter is, for example, a trip counter, and the second counter is, for example, a reset counter.

The authentication unit 220 is responsible for processing related to authentication of a message. For example, the authentication unit 220 is responsible for processing of generating an MAC to be added to a message to be sent. In addition, the authentication unit 220 is responsible for processing of authenticating the message by verifying the MAC added to the received message.

When a message including control data exchanged among the ECU 110, the ECU 111, and the ECU 112 is to be authenticated, the authentication unit 220 is configured to perform authentication on the message which is sent and received among the ECU 110, the ECU 111, and the ECU 112 and which includes at least the control data and the first counter by using at least the control data and the first counter. When it is confirmed whether synchronization is achieved among the ECU 110, the ECU 111, and the ECU 112, the authentication unit 220 performs authentication on a message which is to be sent and received among the ECU 110, the ECU 111, and the ECU 112 and which does not include a first counter but includes a second counter by using the second counter without using the first counter. In accordance with a configuration where the first counter is not to be used when it is confirmed whether synchronization is achieved, it is possible to confirm whether synchronization is achieved through message authentication after an ignition (IG) power source of the vehicle 10 has been turned on, for example.

When it is confirmed whether synchronization is achieved among the ECU 110, the ECU 111, and the ECU 112, in a case where a period in which a negative authentication result is obtained as an authentication result with respect to a plurality of messages received in succession exceeds a predetermined time, the authentication unit 220 determines that synchronization is not achieved among the ECU 110, the ECU 111, and the ECU 112. The predetermined time may be, for example, three seconds. As a result, whether synchronization is achieved can be reliably determined. In the present embodiment, the plurality of messages received in succession refers to a plurality of messages received in succession among messages to which a same CAN ID is designated.

When it has not been confirmed that synchronization is achieved among the ECU 110, the ECU 111, and the ECU 112, the control unit 240 is configured to perform control of the vehicle 10 without using data of a type which is to be exchanged among the ECU 110, the ECU 111, and the ECU 112. As an example, when the ECU 110 is a VSA control ECU and the ECU 111 is an EPS control ECU, in a case where it is determined that synchronization is not achieved, the control unit 240 of the ECU 111 performs steering control in a control mode in which a wheel speed sent from the ECU 110 is not used. The control unit 240 of the ECU 111 may perform control in which power steering is not used. As a result, a configuration can be adopted where travelling of the vehicle 10 is not to be disabled.

At least one of the ECU 110, the ECU 111, or the ECU 112 includes a first ECU configured to send a message including a yaw rate of the vehicle 10 as data, and a second ECU configured to receive the message including the yaw rate as the data. When it has not been confirmed that synchronization is achieved among the ECU 110, the ECU 111, and the ECU 112, the second ECU disables control in which the yaw rate is used and continues the control in which the yaw rate is not used. For example, when the ECU 112 is an SRS control ECU and the ECU 111 is an EPS control ECU, the control unit 240 of the ECU 111 performs ESB control in a control mode in which a yaw rate sent from the ECU 112 is not used. As a result, a configuration can be adopted where travelling of the vehicle 10 is not to be disabled.

When control data is to be sent and received among the ECU 110, the ECU 111, and the ECU 112, the authentication unit 220 performs authentication on a message which is to be sent and received among the ECU 110, the ECU 111, and the ECU 112 and which includes the control data, the first counter, and the second counter by using the control data, the first counter, and the second counter. By performing authentication of data by using the first counter when the control data is to be sent and received, resistance to an attack by malicious third parties can be increased.

When it is confirmed whether synchronization is achieved among the ECU 110, the ECU 111, and the ECU 112, in a case where a number of at least one time to obtain a negative authentication result as an authentication result with respect to a plurality of messages received in succession exceeds a predetermined number of times, the authentication unit 220 determines that synchronization is not achieved among the ECU 110, the ECU 111, and the ECU 112. As a result, whether a response at a dealer is required can be determined.

After it has been confirmed whether synchronization is achieved among the ECU 110, the ECU 111, and the ECU 112, the authentication unit 220 performs authentication on the message which is to be sent and received among the ECU 110, the ECU 111, and the ECU 112 and which includes the control data, the first counter, and the second counter by using the control data, the first counter, and the second counter. As a result, after it has been successfully confirmed whether synchronization is achieved among the ECU 110, the ECU 111, and the ECU 112, by performing authentication of data by using the first counter, the resistance to the attack by the malicious third parties can be increased.

Figure 3:
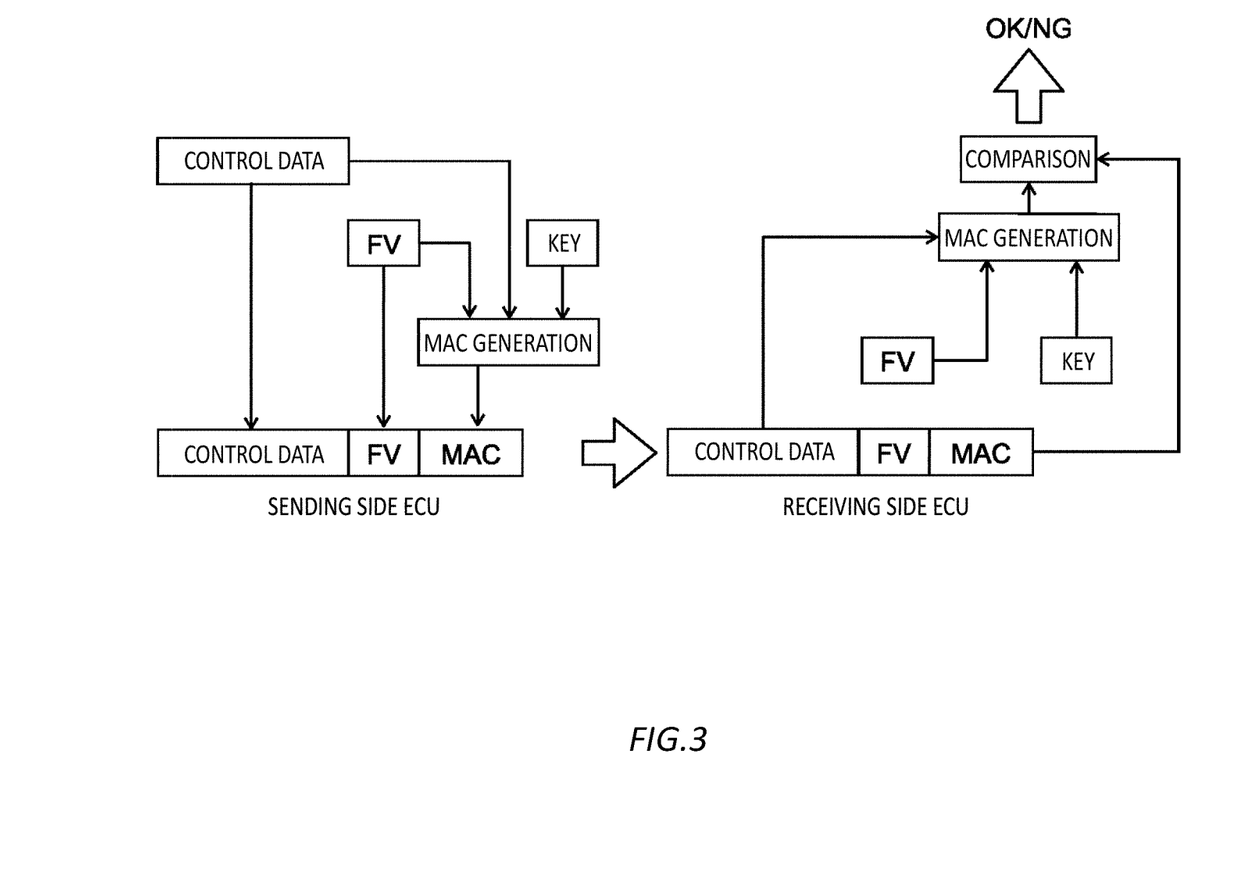
FIG. 3 is a diagram for describing authentication processing of a message in ECUs.

FIG. 3 is a diagram for describing authentication processing of a message in ECUs. FIG. 3 illustrates authentication processing in a case where control data generated by a sending side ECU is to be sent and received between the sending side ECU and a receiving side ECU.

In the sending side ECU, the authentication unit 220 generates control data to be sent to the receiving side ECU. The control data is, for example, sensory data detected by a sensor. For example, the control data may be sensory data such as a yaw rate and a vehicle speed.

The authentication unit 220 of the sending side ECU generates an MAC by using the control data, a freshness value (FV), and a key. The FV is a value that may be updated by the sending side ECU to avoid a retransmission attack. For example, the FV may be generated based on the trip counter to be incremented each time the ignition (IG) power source of the vehicle 10 is turned on, and the reset counter to be incremented every predetermined time. The reset counter may be incremented, for example, every second. The key is a shared key to be shared between the sending side ECU and the receiving side ECU.

The authentication unit 220 of the sending side ECU sends a CAN data frame including the control data, the FV, and the MAC to the CAN communication network 180. For example, the authentication unit 220 stores the control data, the FV, and the MAC in a data field with a data length of 64 bits to be sent to the CAN communication network 180.

When the receiving side ECU receives the CAN data frame data sent to the CAN communication network 180, the authentication unit 220 of the receiving side ECU generates an MAC by using the control data included in the received data frame, the FV, and the key. The key is a shared key to be shared between the sending side ECU and the receiving side ECU. The authentication unit 220 may generate an MAC by using the FV included in the data frame. The authentication unit 220 of the receiving side ECU may generate an MAC by using the FV to be updated in the ECU 110.

The authentication unit 220 of the receiving side ECU determines whether an authentication result is positive or negative based on a comparison between the generated MAC and the MAC included in the received data frame. For example, the authentication unit 220 of the receiving side ECU determines that the authentication result is positive (OK) when the generated MAC matches with the MAC included in the received data frame. The authentication unit 220 of the receiving side ECU determines that the authentication result is negative (NG) when the generated MAC does not match with the MAC included in the received data frame.

When the authentication result is negative, the authentication unit 220 of the receiving side ECU can determine that abnormality is occurring in the CAN communication network 180. As a case where the authentication result may become negative, a case where the key retained in the sending side ECU does not match with the key retained in the receiving side ECU can be exemplified. As a case where the key retained in the sending side ECU does not match with the key retained in the receiving side ECU, a case where control software of the sending side ECU and the receiving side ECU has been subjected to software update over the air (OTA) and also the control software of either the sending side ECU or the receiving side ECU has not been normally updated or the like can be exemplified.

In addition to the above, as a case where the authentication result may become negative, a case where the FV to be updated in the sending side ECU does not match with the FV to be updated in the receiving side ECU due to a transmission delay or the like can be exemplified. As another case where the authentication result may become negative, a case where the control data has not been normally sent due to noise or the like in the CAN communication network 180 can be exemplified. As another case where the authentication result may become negative, a case where an illegal data frame has been input to the CAN communication network 180 by malicious third parties can be exemplified.

Figure 4:
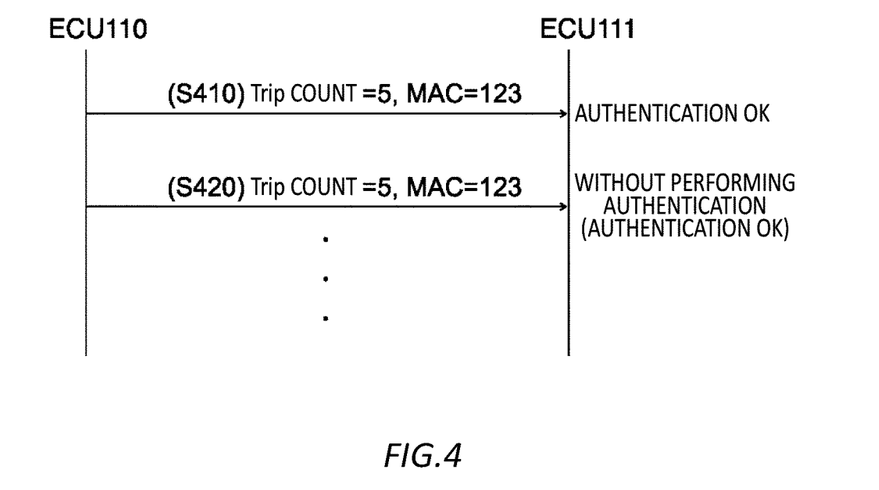
FIG. 4 illustrates an example of a sequence of sending and receiving the message by using a trip count between the ECU 110 and an ECU 111.

FIG. 4 illustrates an example of a sequence of sending and receiving a message by using a trip count between the ECU 110 and the ECU 111. Herein, it is assumed that the ECU 110 is the sending side ECU, and the ECU 111 is the receiving side ECU. After the IG power source of the vehicle 10 is turned on, at a time point at which the sending and receiving sequence of FIG. 4 starts, it is assumed that communication involving the authentication processing using the MAC is not performed between the ECU 110 and the ECU 111. It is assumed that since the IG power source of the vehicle 10 is turned on, the trip count retained in each ECU included in the vehicle 10 becomes 5.

In S410, the authentication unit 220 of the ECU 110 sends the message including the trip count as the FV and the MAC to the CAN communication network 180. When the message is received in the ECU 111, the authentication unit 220 of the ECU 111 performs the authentication processing described above, and obtains a positive authentication result (authentication OK).

In S420, the ECU 110 sends a message including the trip count as the FV and the MAC to the CAN communication network 180. The trip count is to be incremented each time the IG power source is turned on. The trip count does not change during a period after the IG power source is turned on until the IG power source is turned off. When the message is received in the ECU 111, the authentication unit 220 of the ECU 111 determines whether a value of the trip count matches with a value at a time when authentication has been performed in a past. According to a specification set by Japan Automotive Software Platform and Architecture (JASPAR), when the value of the trip count matches with the value at a time when authentication has been performed in the past, the authentication unit 220 of the ECU 111 determines that authentication is regarded as successful without performing authentication using the MAC (authentication OK). Hereinafter, similarly, when a message with a same trip count is received in the ECU 111, the authentication unit 220 determines that authentication is regarded as successful.

Figure 5:
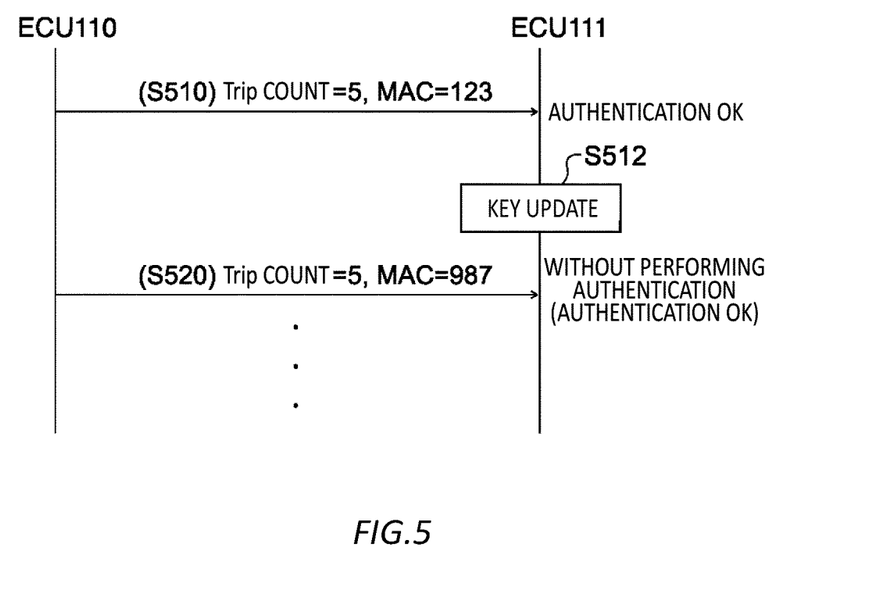
FIG. 5 illustrates an example of the sequence of sending and receiving the message by using the trip count between the ECU 110 and the ECU 111.

FIG. 5 illustrates an example of the sequence of sending and receiving the message by using the trip count between the ECU 110 and the ECU 111. FIG. 5 is a sequence in a case where the MAC generation key is updated by software update in the ECU 111, and on the other hand, the MAC generation key is not updated since software update has failed in the ECU 110.

Similarly as in FIG. 4, it is assumed that the ECU 110 is the sending side ECU, and the ECU 111 is the receiving side ECU. After the IG power source of the vehicle 10 is turned on, at a time point at which the sending and receiving sequence of FIG. 5 starts, it is assumed that communication involving the authentication processing using the MAC is not performed between the ECU 110 and the ECU 111. It is assumed that since the IG power source of the vehicle 10 is turned on, the trip count retained in each ECU included in the vehicle 10 becomes 5.

In S510, the authentication unit 220 of the ECU 110 sends a message including the trip count as the FV and the MAC to the CAN communication network 180. When the message is received in the ECU 111, the authentication unit 220 of the ECU 111 performs the authentication processing described above, and obtains a positive authentication result (authentication OK).

In S512, when software update is performed in the ECU 111, the MAC generation key retained in the ECU 111 is updated. On the other hand, since software update has failed in the ECU 110, the MAC generation key retained in the ECU 110 is not updated. As a result, a state has established where the MAC generation keys do not match between the ECU 110 and the ECU 111.

In S520, the ECU 110 sends a message including the trip count as the FV and the MAC to the CAN communication network 180. According to the specification set by Japan Automotive Software Platform and Architecture (JASPAR), when the value of the trip count matches with the value at a time when authentication has been performed in the past, the authentication unit 220 of the ECU 111 determines that authentication is regarded as successful without performing authentication using the MAC (authentication OK). As a result, it is determined that authentication is regarded as successful even when a state has established where the MAC generation keys do not match between the ECU 110 and the ECU 111. Accordingly, sensing of the establishment of a state where the MAC generation keys do not match between the ECU 110 and the ECU 111 can be avoided.

Figure 6:
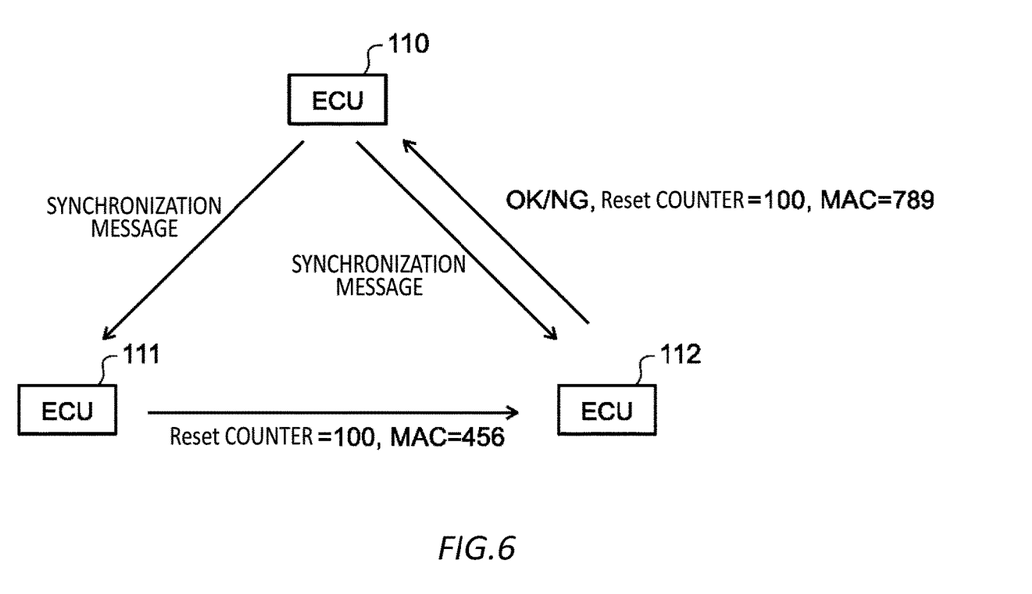
FIG. 6 schematically illustrates processing interacted to confirm whether synchronization is mutually achieved among the ECU 110, the ECU 111, and an ECU 112.

FIG. 6 schematically illustrates processing interacted to confirm whether synchronization is mutually achieved among the ECU 110, the ECU 111, and the ECU 112.

The ECU 110 functions as an FV master, and each of the ECU 111 and ECU 112 functions as an FV slave. The ECU 110 sends, to the ECU 111 and ECU 112, a synchronization message for instructing a confirmation on whether synchronization is achieved between the ECU 111 and ECU 112. When the synchronization message is received, the authentication unit 220 of the ECU 111 sets an FV which includes a reset counter but does not include a trip counter. The authentication unit 220 generates an MAC by using data to be sent to the ECU 112, an FV, and a key currently retained in the ECU 111, and sends a message including the data, the FV, and the MAC to the CAN communication network 180.

When the ECU 112 receives the message sent from the ECU 111, the authentication unit 220 of the ECU 112 determines whether the reset counter included in the received message matches with the reset counter retained in the ECU 112, and in a case where the reset counters match, performs authentication by comparing the MACs by the authentication processing described above. When a positive authentication result is obtained, it is possible to determine that the keys match between the ECU 111 and the ECU 112. When a negative authentication result is obtained, it is possible to determine that the keys do not match between the ECU 111 and the ECU 112. The authentication unit 220 of the ECU 112 generates an MAC by using data indicating whether a positive authentication result has been obtained or a negative authentication result has been obtained, a reset counter as the FV, and a key currently retained in the ECU 112, and sends a message including the data, the FV, and the MAC to the CAN communication network 180.

When the ECU 110 receives the message sent from the ECU 112, the authentication unit 220 of the ECU 110 determines whether the reset counter included in the received message matches with the reset counter retained in the ECU 110, and in a case where the reset counters match, performs authentication by comparing the MACs by the authentication processing described above. When a positive authentication result has been obtained and also the data included in the message received from the ECU 112 indicates that a positive authentication result has been obtained, the authentication unit 220 of the ECU 110 determines that synchronization is achieved among the ECU 110, the ECU 111, and the ECU 112. That is, the authentication unit 220 of the ECU 110 determines that the reset counters match and the keys match among the ECU 110, the ECU 111, and the ECU 112.

On the other hand, when a positive authentication result has been obtained or when the data included in the message received from the ECU 112 indicates that a negative authentication result has been obtained, the authentication unit 220 of the ECU 110 determines that synchronization is not achieved among the ECU 110, the ECU 111, and the ECU 112. That is, the authentication unit 220 of the ECU 110 determines that the reset counters do not match or the keys do not match among the ECU 110, the ECU 111, and the ECU 112.

As the description has been provided in association with FIG. 6, when it is confirmed whether synchronization is achieved among the ECU 110, the ECU 111, and the ECU 112, by adopting a configuration where the trip counter is not to be used, it is possible to sense the establishment of a state where the keys do not match between the ECU 111 and the ECU 112, and the ECU 110. Note that when the data included in the message received from the ECU 112 indicates that a negative authentication result has been obtained, the authentication unit 220 of the ECU 112 can determine that the keys do not match between the ECU 111 and the ECU 112. Therefore, the authentication unit 220 of the ECU 110 can sense whether a state has been established where the keys do not match between at least any of the ECU 110, the ECU 111, and the ECU 112.

When a number of at least one time to determine that synchronization is not achieved among the ECU 110, the ECU 111, and the ECU 112 with respect to a plurality of synchronization messages sent in succession exceeds a predetermined number of times, the authentication unit 220 of the ECU 110 may determine that synchronization is not achieved among the ECU 110, the ECU 111, and the ECU 112. When a period during which it is determined that synchronization is not achieved among the ECU 110, the ECU 111, and the ECU 112 with respect to a plurality of synchronization messages sent in succession exceeds a predetermined time, the authentication unit 220 of the ECU 110 may determine that synchronization is not achieved among the ECU 110, the ECU 111, and the ECU 112. As a result, a probability of erroneous sensing of a synchronous state can be decreased.

Figure 7:
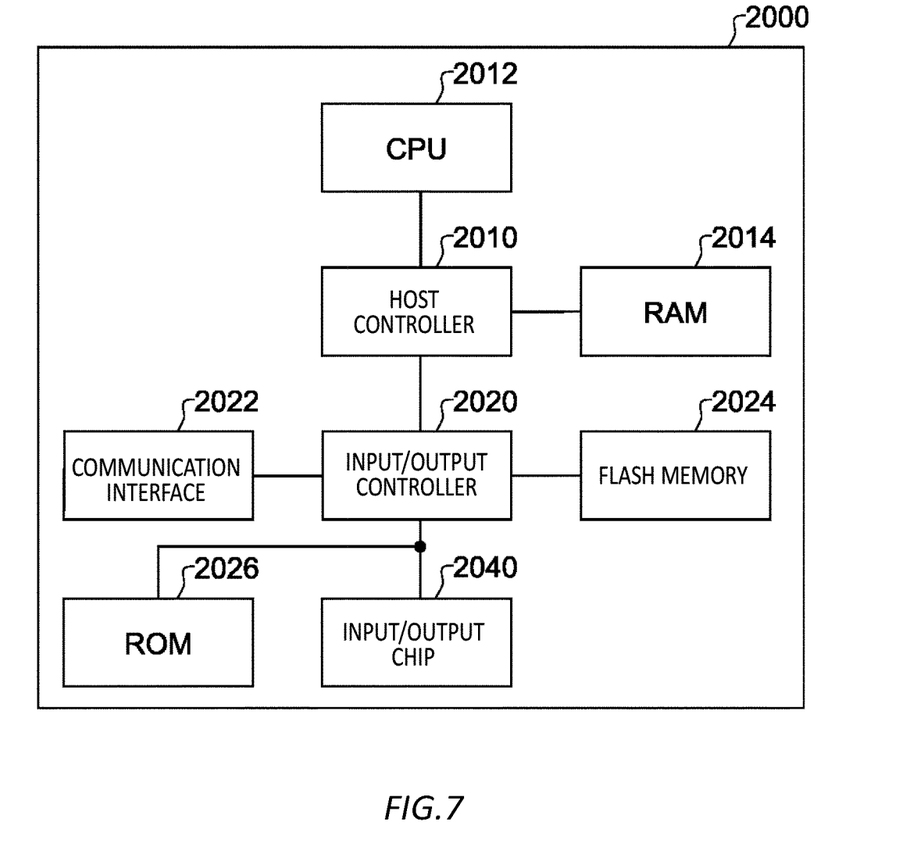
FIG. 7 schematically illustrates an example of a computer 2000.

FIG. 7 illustrates an example of a computer 2000 in which a plurality of embodiments of the present invention may be entirely or partially embodied. Programs installed in the computer 2000 can cause the computer 2000 to: function as a system such as the system 20 according to the embodiments or each unit of the system or apparatuses such as the ECU 110, the ECU 111, and the ECU 112 according to the embodiments or each unit of the apparatuses; execute operations associated with the system or each unit of the system or the apparatuses or each unit of the apparatuses; and/or execute a process according to the embodiments or steps of the process. Such a program may be executed by a CPU 2012 to cause the computer 2000 to perform certain operations associated with the processing procedures described herein and some of or all of the blocks in the block diagrams.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, thereby controlling each unit.

The communication interface 2022 communicates with other electronic devices via a network. The flash memory 2024 stores programs and data used by the CPU 2012 within the computer 2000. The ROM 2026 stores therein a boot program or the like executed by the computer 2000 at the time of activation, and/or a program depending on the hardware of the computer 2000. The input/output chip 2040 may connect various input/output units such as a keyboard, a mouse, and a monitor to the input/output controller 2020 via input/output ports such as a serial port, a parallel port, a keyboard port, a mouse port, a monitor port, a USB port, and a HDMI (registered trademark) port.

A program is provided via a network or computer readable storage media such as a CD-ROM, a DVD-ROM, or a memory card. The RAM 2014, the ROM 2026, or the flash memory 2024 is an example of the computer readable storage medium. Programs are installed in the flash memory 2024, the RAM 2014, or the ROM 2026 and executed by the CPU 2012. The information processing written in these programs is read by the computer 2000, and thereby cooperation between a program and the above-described various types of hardware resources is achieved. A device or method may be constituted by carrying out the operation or processing of information by using the computer 2000.

For example, when communication is carried out between the computer 2000 and an external device, the CPU 2012 may execute a communication program loaded onto the RAM 2014 to instruct communication processing to the communication interface 2022, based on the processing written in the communication program. The communication interface 2022, under control of the CPU 2012, reads transmission data stored on transmission buffering regions provided in recording media such as the RAM 2014 and the flash memory 2024, and transmits the read transmission data to a network and writes reception data received from a network to reception buffering regions or the like provided on the recording media.

In addition, the CPU 2012 may cause all or a necessary portion of a file or a database to be read into the RAM 2014, the file or the database having been stored in a recording medium such as the flash memory 2024, etc., and perform various types of processing on the data on the RAM 2014. The CPU 2012 may then write back the processed data to the recording medium.

Various types of information, such as various types of programs, data, tables, and databases, may be stored in the recording medium to undergo information processing. The CPU 2012 may perform various types of processing on the data read from the RAM 2014, which includes various types of operations, information processing, conditional judging, conditional branch, unconditional branch, search/replace of information, etc., as described herein and designated by an instruction sequence of programs, and writes the result back to the RAM 2014. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby acquiring the attribute value of the second attribute associated with the first attribute satisfying the predetermined condition.

The programs or software modules described above may be stored in the computer readable storage medium on the computer 2000 or in the vicinity of the computer 2000. A recording medium such as a hard disk or a RAM provided in a server system connected to a dedicated communication network or the Internet can be used as the computer readable storage media. A program stored in the computer readable storage medium may be provided to the computer 2000 via a network.

A program, which is installed on the computer 2000 and causes the computer 2000 to function as the ECU 110, may work on the CPU 2012 or the like to cause the computer 2000 to function as each unit of the ECU 110. The information processing written in these programs are read by the computer 2000 to cause the computer to function as each unit of the ECU 110, which is specific means realized by the cooperation of software and the various types of hardware resources described above. Then, by the specific means realizing calculation or processing of information according to a purpose of use of the computer 2000 in the present embodiment, the unique ECU 110 according to the purpose of use is constructed.

A program, which is installed on the computer 2000 and causes the computer 2000 to function as the ECU 111, may work on the CPU 2012 or the like to cause the computer 2000 to function as each unit of the ECU 111. The information processing written in these programs are read by the computer 2000 to cause the computer to function as each unit of the ECU 111, which is specific means realized by the cooperation of software and the various types of hardware resources described above. Then, by the specific means realizing calculation or processing of information according to a purpose of use of the computer 2000 in the present embodiment, the unique ECU 111 according to the purpose of use is constructed.

A program, which is installed on the computer 2000 and causes the computer 2000 to function as the ECU 112, may work on the CPU 2012 or the like to cause the computer 2000 to function as each unit of the ECU 112. The information processing written in these programs are read by the computer 2000 to cause the computer to function as each unit of the ECU 112, which is specific means realized by the cooperation of software and the various types of hardware resources described above. Then, by the specific means realizing calculation or processing of information according to a purpose of use of the computer 2000 in the present embodiment, the unique ECU 112 according to the purpose of use is constructed.

Various embodiments have been described by referring to the block diagrams and the like. In the block diagram, each block may represent (1) a step of a process in which an operation is executed, or (2) each unit of the device having a role of executing the operation. Certain steps and each unit may be implemented by dedicated circuitry, programmable circuitry supplied with computer readable instructions stored on computer readable storage media, and/or processors supplied with computer readable instructions stored on computer readable storage media. Dedicated circuitry may include digital and/or analog hardware circuits and may include integrated circuits (IC) and/or discrete circuits. Programmable circuitry may include reconfigurable hardware circuits including logical AND, logical OR, logical XOR, logical NAND, logical NOR, and other logical operations, flip-flops, registers, memory elements, etc., such as field-programmable gate arrays (FPGA), programmable logic arrays (PLA), etc.

Computer readable storage media may include any tangible device that can store instructions for execution by a suitable device, such that the computer readable storage medium having instructions stored therein forms at least a portion of an article of manufacture including instructions which can be executed to create means for performing processing operations or operations specified in the block diagrams. Examples of the computer readable storage medium may include an electronic storage medium, a magnetic storage medium, an optical storage medium, an electromagnetic storage medium, a semiconductor storage medium, and the like. More specific examples of the computer readable storage medium may include a floppy disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

Computer readable instructions may be provided to a processor of a general purpose computer, special purpose computer, or other programmable data processing device, or to programmable circuitry, locally or via a local area network (LAN), wide area network (WAN) such as the Internet, etc., to execute the computer readable instructions to provide means for performing described processing procedure or operations specified in the block diagrams. Examples of the processor include a computer processor, a processing unit, a microprocessor, a digital signal processor, a controller, a microcontroller, and the like.

While the present invention has been described with the embodiments, the technical scope of the present invention is not limited to the above described embodiments. It is apparent to persons skilled in the art that various alterations and improvements can be added to the above-described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

10: vehicle:
20: system:
100: ECU:
110: ECU:
111: ECU:
112: ECU:
120: ECU:
121: ECU:
122: ECU:
180: CAN communication network:
200: processing unit:
220: authentication unit:
240: control unit:
280: storage unit:
2000: computer:
2010: host controller:
2012: CPU:
2014: RAM:
2020: input/output controller:
2022: communication interface:
2024: flash memory:
2026: ROM:
2040: input/output chip.

What is claimed is:

1. A system comprising a plurality of in-vehicle devices and having a function of determining abnormality of communication in the plurality of in-vehicle devices by authenticating a message including data, a first counter configured to be counted each time a power source is turned on, and a second counter configured to be incremented over time, the system comprising
an authentication unit configured to perform, when a message including control data to be exchanged between the plurality of in-vehicle devices is to be authenticated, authentication on a message which is to be sent and received between the plurality of in-vehicle devices and which includes at least the control data and the first counter by using at least the control data and the first counter, wherein
when it is confirmed whether synchronization is achieved between the plurality of in-vehicle devices, the authentication unit is configured to perform authentication on a message which is to be sent and received between the plurality of in-vehicle devices and which does not include the first counter but includes the second counter by using the second counter without using the first counter.

2. The system according to claim 1, wherein
when it is confirmed whether synchronization is achieved between the plurality of in-vehicle devices, in a case where a period during which a negative authentication result is obtained as an authentication result with respect to a plurality of messages received in succession exceeds a predetermined time, the authentication unit is configured to determine that synchronization is not achieved between the plurality of in-vehicle devices.

3. The system according to claim 1, further comprising:
a control unit configured to perform control of a vehicle without using data of a type which is to be exchanged between the plurality of in-vehicle devices when it has not been confirmed that synchronization is achieved between the plurality of in-vehicle devices.

4. The system according to claim 3, wherein
the plurality of in-vehicle devices includes a first in-vehicle device configured to send a message including a yaw rate of the vehicle as data, and a second in-vehicle device configured to receive the message including the yaw rate as the data, and
when it has not been confirmed that synchronization is achieved between the plurality of in-vehicle devices, the second in-vehicle device is configured to disable control in which the yaw rate is to be used and continue control in which the yaw rate is not to be used.

5. The system according to claim 1, wherein
when the control data is to be sent and received between the plurality of in-vehicle devices, the authentication unit is configured to perform authentication on a message which is to be sent and received between the plurality of in-vehicle devices and which includes the control data, the first counter, and the second counter by using the control data, the first counter, and the second counter.

6. The system according to claim 1, wherein
when it is confirmed whether synchronization is achieved between the plurality of in-vehicle devices, in a case where a number of at least one time to obtain a negative authentication result as an authentication result with respect to a plurality of messages received in succession exceeds a predetermined number of times, the authentication unit is configured to determine that synchronization is not achieved between the plurality of in-vehicle devices.

7. The system according to claim 1, wherein
after it has been confirmed that synchronization is achieved between the plurality of in-vehicle devices, the authentication unit is configured to perform authentication on a message which is to be sent and received between the plurality of in-vehicle devices and which includes the control data, the first counter, and the second counter by using the control data, the first counter, and the second counter.

8. The system according to claim 2, further comprising:
a control unit configured to perform control of a vehicle without using data of a type which is to be exchanged between the plurality of in-vehicle devices when it has not been confirmed that synchronization is achieved between the plurality of in-vehicle devices.

9. The system according to claim 8, wherein
the plurality of in-vehicle devices includes a first in-vehicle device configured to send a message including a yaw rate of the vehicle as data, and a second in-vehicle device configured to receive the message including the yaw rate as the data, and when it has not been confirmed that synchronization is achieved between the plurality of in-vehicle devices, the second in-vehicle device is configured to disable control in which the yaw rate is to be used and continue control in which the yaw rate is not to be used.

10. The system according to claim 2, wherein when control data is to be sent and received between the plurality of in-vehicle devices, the authentication unit is configured to perform authentication on a message which is to be sent and received between the plurality of in-vehicle devices and which includes the control data, the first counter, and the second counter by using the control data, the first counter, and the second counter.

11. The system according to claim 3, wherein when control data is to be sent and received between the plurality of in-vehicle devices, the authentication unit is configured to perform authentication on a message which is to be sent and received between the plurality of in-vehicle devices and which includes the control data, the first counter, and the second counter by using the control data, the first counter, and the second counter.

12. The system according to claim 4, wherein when control data is to be sent and received between the plurality of in-vehicle devices, the authentication unit is configured to perform authentication on a message which is to be sent and received between the plurality of in-vehicle devices and which includes the control data, the first counter, and the second counter by using the control data, the first counter, and the second counter.

13. The system according to claim 2, wherein when it is confirmed whether synchronization is achieved between the plurality of in-vehicle devices, in a case where a number of at least one time to obtain a negative authentication result as an authentication result with respect to a plurality of messages received in succession exceeds a predetermined number of times, the authentication unit is configured to determine that synchronization is not achieved between the plurality of in-vehicle devices.

14. The system according to claim 3, wherein when it is confirmed whether synchronization is achieved between the plurality of in-vehicle devices, in a case where a number of at least one time to obtain a negative authentication result as an authentication result with respect to a plurality of messages received in succession exceeds a predetermined number of times, the authentication unit is configured to determine that synchronization is not achieved between the plurality of in-vehicle devices.

15. The system according to claim 4, wherein when it is confirmed whether synchronization is achieved between the plurality of in-vehicle devices, in a case where a number of at least one time to obtain a negative authentication result as an authentication result with respect to a plurality of messages received in succession exceeds a predetermined number of times, the authentication unit is configured to determine that synchronization is not achieved between the plurality of in-vehicle devices.

16. The system according to claim 2, wherein after it has been confirmed that synchronization is achieved between the plurality of in-vehicle devices, the authentication unit is configured to perform authentication on a message which is to be sent and received between the plurality of in-vehicle devices and which includes the control data, the first counter, and the second counter by using the control data, the first counter, and the second counter.

17. The system according to claim 3, wherein after it has been confirmed that synchronization is achieved between the plurality of in-vehicle devices, the authentication unit is configured to perform authentication on a message which is to be sent and received between the plurality of in-vehicle devices and which includes the control data, the first counter, and the second counter by using the control data, the first counter, and the second counter.

18. The system according to claim 4, wherein after it has been confirmed that synchronization is achieved between the plurality of in-vehicle devices, the authentication unit is configured to perform authentication on a message which is to be sent and received between the plurality of in-vehicle devices and which includes the control data, the first counter, and the second counter by using the control data, the first counter, and the second counter.

19. A vehicle comprising the system according to claim 1.

20. A method comprising:

performing, when a message including control data to be exchanged between a plurality of in-vehicle devices is to be authenticated, authentication on a message which is to be sent and received between the plurality of in-vehicle devices and which includes at least the control data and a first counter configured to be counted each time a power source of the plurality of in-vehicle devices is turned on by using at least the control data and the first counter; and performing, when it is confirmed whether synchronization is achieved between the plurality of in-vehicle devices, authentication on a message which is to be sent and received between the plurality of in-vehicle devices and which does not include the first counter but includes a second counter configured to be incremented over time, by using the second counter without using the first counter, wherein in a case where a period during which a negative authentication result is obtained as an authentication result with respect to a plurality of messages received in succession exceeds a predetermined time, it is determined that synchronization is not achieved between the plurality of in-vehicle devices.

* * * * *